US008734607B2

(12) United States Patent
Kumagai et al.

(10) Patent No.: US 8,734,607 B2
(45) Date of Patent: May 27, 2014

(54) METHOD OF PRODUCING OPTICAL FILM LAMINATE

(75) Inventors: Daisuke Kumagai, Ibaraki (JP); Toshirou Nishikubo, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/617,761

(22) Filed: Sep. 14, 2012

(65) Prior Publication Data

US 2013/0008590 A1 Jan. 10, 2013

Related U.S. Application Data

(62) Division of application No. 12/867,704, filed as application No. PCT/JP2009/051835 on Feb. 4, 2009.

(30) Foreign Application Priority Data

Feb. 15, 2008 (JP) ................................. 2008-034408

(51) Int. Cl.
*B32B 38/10* (2006.01)

(52) U.S. Cl.
USPC .. 156/248; 156/250; 359/485.03; 359/485.04

(58) Field of Classification Search
USPC .............. 156/192, 247, 249, 248, 306.6, 250, 156/251, 182, 166, 266, 263; 359/489.07, 359/485.03, 485.04, 487.06; 259/485.03, 259/485.04, 487.06
See application file for complete search history.

(56) References Cited

U.S. PATENT DOCUMENTS

2007/0211335 A1* 9/2007 Ikeda et al. .................. 359/485

FOREIGN PATENT DOCUMENTS

| CN | 1217477 A | 5/1999 | |
|---|---|---|---|
| JP | 11-231129 A | 8/1999 | |
| JP | 2004-199045 A | 7/2004 | |
| JP | 2005-326831 A | 11/2005 | |
| JP | 2007-219022 * | 8/2007 | ............ G02B 5/30 |
| JP | 2007-219022 A | 8/2007 | |
| WO | 2005-101068 A1 | 10/2005 | |

OTHER PUBLICATIONS

International Search Report of PCT/JP2009/051835, Mailing Date of May 19, 2009.
International Preliminary Report on Patentability (Form PCT/IB/373) of International Application No. PCT/JP2009/051835 dated Oct. 5, 2010 with Forms PCT/ISA/237.
Japanese Office Action dated Jun. 15, 2012, issued in corresponding Japanese Patent Application No. 2008-034408, with English translation.

* cited by examiner

*Primary Examiner* — Katarzyna Wyrozebski Lee
*Assistant Examiner* — Vishal I Patel
(74) *Attorney, Agent, or Firm* — Westerman, Hattori, Daniels & Adrian, LLP

(57) ABSTRACT

A method of producing an optical film laminate includes: a first film layer forming step of cutting a first optical film having an elongated shape into first optical film pieces along cutting lines crossing the longitudinal direction of the first optical film and disposing the first optical film pieces adjacent to each other in a substantially band or strip shape; a second film layer forming step of cutting a second optical film having an elongated shape into second optical film pieces along cutting lines crossing the longitudinal direction of the second optical film and disposing the second optical film pieces adjacent to each other in a substantially band or strip shape; and a cutting step of, while holding a third film layer made of the third optical film, the first film layer and the second film layer in a laminated state, cutting them into plural optical film laminates.

6 Claims, 12 Drawing Sheets

METHOD OF PRODUCING OPTICAL FILM LAMINATE

CROSS-REFERENCE TO RELATED APPLICATIONS

This application is a Divisional of U.S. application Ser. No. 12/867,704, filed Aug. 13, 2010, and wherein application Ser. No. 12/867,704 is a national stage application filed under 35 USC §371 of International Application No. PCT/JP2009/051835, filed Feb. 4, 2009, and which is based upon and claims the benefit of priority from the prior Japanese Patent Application No. 2008-034408, filed on Feb. 15, 2008, the entire contents of which are incorporated herein by reference.

FIELD OF THE INVENTION

The present invention relates mainly to a method of producing an optical film laminate, and particularly, to a method of producing an optical film laminate that is made up of three or more optical films, such as a polarizing film and an optical compensation film, laminated together.

RELATED ART

In these days, for a liquid crystal display device, not only a polarizing film but also various kinds of optical compensation films are used to improve defaults of visibility due to the birefringence of a liquid crystal cell used, and an optical film laminate with the polarizing film and the optical compensation films laminated together frequently constitutes a part of the liquid crystal display device.

Meanwhile, the optical film laminate is produced by preparing respective optical films such as a polarizing film and an optical compensation film individually of each other, then laminating them together, and then cutting it into a predetermined size and a predetermined shape. In this respect, the thus prepared optical film laminate has an inherent drawback in that the optical films respectively have given optical orientation axes (e.g., a polarizing film has an absorption axis and a retardation film has a slow axis), and therefore the optical films must be laminated together to respectively have their optical orientation axes oriented at predetermined angles relative to each other when the optical film laminate is formed.

When the optical film laminate is used as one member of a liquid crystal display device, the optical film laminate is cut into a size and a shape corresponding to the size and the shape of the liquid crystal display device. Therefore, relative to the shape of the optical film laminate, it is necessary to make an adjustment so as to have the optical orientation axis of each of the optical films oriented in a predetermined direction.

For example, when an optical film laminate for a liquid crystal display device, which has a polarizing film and two retardation films laminated together and is formed into a rectangular shape, is produced, a total of three optical orientation axes including one absorption axis of the polarizing film and two slow axes of the two retardation films must be each oriented at a predetermined angle relative to one side of an outline of the rectangular shape of the optical film laminate.

Hitherto, as a method of producing this kind of optical film laminate, for example, a method described in the following Patent Document 1 is known. The method of the Patent Document 1 includes, as shown in FIGS. 9 and 10, preparing a laminate intermediate 103 by laminating a first optical film 101 (e.g., a retardation film) having an elongated shape to a second optical film 102 (e.g., a polarizing film) having an elongated shape, and then cutting the laminate intermediate 103 into chips 104 having a predetermined shape (e.g., a very small rectangular shape). Herein, when the first optical film 101 and the second optical film 102 are laminated together, the first optical film 101 is cut into cut pieces 101a having a parallelogram shape in advance to have ends of both the overlapped films matched to each other, in consideration of the necessity to laminate the first optical film 101 to the second optical film 102 to have them oriented at a predetermined angle relative to each other, that is, have a slow axis X of the retardation film 101 and an absorption axis Y of the polarizing film oriented at a predetermined angle relative to each other. Herein, this method is called for convenience a conventional A-type method.

Patent Document 1: Japanese Patent Application Laid-open No. Hei 11-2311.29

The conventional A-type producing method can improve the operational efficiency as compared with a method that includes cutting a first optical film and a second optical film individually of each other into chips, and then laminating the chip-shaped films together, or cutting a first optical film and a second optical film individually of each other into pieces having a shape similar to a chip shape, which contain a predetermined number of chips, and laminating the pieces and then cutting it into chips.

As a method of producing an optical film laminate which is an improved method of the conventional A-type method, the following method was also studied. Specifically, as shown in FIGS. 11 and 12, the method includes preparing a laminate intermediate 203 by laminating a first optical film 201 (e.g., a retardation film) having an elongated shape to a second optical film 202 (e.g., a polarizing film) having an elongated shape, and then cutting the laminate intermediate 203 into chips 204 having a predetermined shape (e.g., a very small rectangular shape), in which the first optical film 201 is previously cut into a substantially rectangular cut piece 201a having a predetermined length when the first optical film 201 is laminated to the second optical film 202, then laminating the cut piece 201a to the second optical film 202 while being displaced from each other at a predetermined angle so as to have the slow axis X of the retardation film 201 oriented at a predetermined angle relative to the absorption axis Y of the polarizing film, then cutting a portion of the first optical film protruding outward from the second optical film and relocating and laminating the cut portion on an unlaminated portion, thereby preparing a laminate intermediate 203, and cutting the laminate intermediate 203 into minute rectangular chips 204. Herein, this method is called for convenience a conventional B-type method.

The conventional B-type method was conceived in consideration of the fact that, when the lamination angle between the longitudinal direction of the first optical film and the longitudinal direction of the second optical film is shallow, the first optical film must be cut into a shape of a very long parallelogram in the conventional A-type method, which causes difficulty in cutting operation and handling of a cut film. In other words, the conventional B-type method was conceived to facilitate cutting operation of the first optical film and handling of the cut pieces after cutting the film, while at the same time improve the yield by the effective utilization of the portion protruded when in lamination, by cutting the first optical film into a substantially rectangular shape without taking into account the lamination angle of the first optical film relative to the second optical film.

DISCLOSURE OF THE INVENTION

Problems to be Solved by the Invention

However, when an optical film laminate is prepared by laminating three or more optical films, the aforesaid conventional A-type or conventional B-type method has a drawback in that production efficiency is poor and the yield is likely to be lowered.

For example, when an optical film laminate is prepared by laminating three optical films by any conventional method, it is necessary to first cut a first optical film into pieces and laminate each cut piece to a second optical film, thereby preparing a laminate intermediate made up of two optical films, then cut this two-layered laminate intermediate from the second optical film to have cut pieces, then laminate each cut piece to a third optical film, thereby preparing a laminate intermediate made up of three optical films, and then cut out final chips from the three-layered laminate intermediate.

That is, when a three-layered laminate intermediate is formed, it is necessary to form a two-layered laminate intermediate in a preceding step and cut this laminate into cut pieces. Therefore, the shape and size of the cut pieces vary depending on the width of a raw optical film or the lamination angle of optical films, which results in generation of a portion with any of the three optical films not laminated thereon when a three-layered laminate intermediate has been prepared and thus sometimes deterioration of the yield per area. This problem becomes more significant as the number of optical films to be laminated increases.

When a three-layered laminate intermediate is formed, it is necessary to perform laminating by using cut pieces of a two-layered laminate intermediate, which poses a problem in that the laminating operation is difficult to be iriade and is troublesome. This problem also becomes more significant as the number of optical films to be laminated increases.

The present invention has been conceived in consideration of such problems associated with the prior arts. It is an object of the present invention to improve the yield per area of optical films to be used and improve the working property when an optical film laminate, which is prepared by laminating three or more optical films to have the optical orientation axis of each film oriented at a predetermined angle, is produced.

Means For Solving Problems

According to the present invention, there is provided a method of producing an optical film laminate having three or more optical films laminated together, each of the optical films having an optical orientation axis, the method including: a first film layer forming step of cutting a first optical film having an elongated shape into first optical film pieces along cutting lines crossing the longitudinal direction of the first optical film and disposing the first optical film pieces adjacent to each other in a substantially band or strip shape, thereby forming a first film layer having an optical orientation axis crossing the longitudinal direction of the band or strip-shaped first optical film pieces; a second film layer forming step of cutting a second optical film having an elongated shape into second optical film pieces along cutting lines crossing the longitudinal direction of the second optical film and disposing the second optical film pieces adjacent to each other in a substantially band or strip shape, thereby forming a second film layer having an optical orientation axis crossing the longitudinal direction of the band or strip-shaped second optical film pieces; and a cutting step of, while holding a third film layer made of the third optical film, the first film layer and the second film layer in a laminated state, cutting them into plural optical film laminates According to the method of producing an optical film laminate including the above steps, the optical film pieces formed by cutting the optical film are disposed adjacent to each other in a substantially band or strip shape, thereby forming a film layer having an optical orientation axis crossing the longitudinal direction of the band or strip shaped optical film pieces, and then, while the thus formed film layers are held in a laminated state, they are cut into plural optical film laminates (i.e., a product), so that it is possible to produce an advantageous effect of improving the yield per area since unlaminated portions of optical film pieces are unlikely to occur even when plural film layers are laminated to each other.

Furthermore, the optical film pieces which together make up one film layer are not required to be laminated as a laminate with optical film pieces of another film layer, and can be disposed without consideration of the relative position with respect to the optical film pieces of another film layer. The thus produced laminate has a band or strip shape. Therefore, there is an advantageous effect of greatly improving the working property in producing optical film laminates.

In the method of producing an optical film laminate, at least one of the first film layer forming step and the second film layer forming step may be a step that is performed by using an elongated adhesive film having an adhesive layer and a releasing layer laminated on the adhesive layer, and placing any of the first optical film pieces and the second optical film pieces on the adhesive film via the adhesive layer It is possible to remarkably simplify the first film layer forming step or the second film layer forming step by placing the first optical film pieces or the second optical film pieces on an elongated adhesive film having the adhesive layer and the releasing layer laminated on the adhesive layer. Furthermore, the thus produced first film layer or the thus formed second film layer has an elongated shape and has a releasing layer and an adhesive layer, and thereby it can be easily laminated to another film layer in a lamination step by exposing the adhesive layer to the outside by removing the releasing layer.

The method of producing an optical film laminate may further include: a first film layer winding step of winding the first film layer, which has been formed into an elongated shape by placing the first optical film pieces on the adhesive film, into a roll along with the adhesive film; a second film layer winding step of winding the second film layer, which has been formed into an elongated shape by placing the second optical film pieces on the adhesive film, into a roll along with the adhesive film; and a successive lamination step of bringing the first to third film layers into a laminated state by laminating the first film layer and the second film layer, each having been wound into a roll, to the third film layer having been wound into a roll, by roll to roll lamination.

By performing the first film layer winding step and the second film layer winding step, it is possible to handle the first film layer and the second film layer while keeping them in a rolled state and hence further facilitate storage or handling of a prepared film layer.

In the method of producing an optical film laminate, the first film layer forming step may be performed by feeding out the third optical film from a raw film roll in the longitudinal direction and placing the first optical film pieces on the fed third optical film; and the second film layer forming step may be performed by placing the second optical film pieces on any one of the fed third optical film and the formed first film layer.

According to the above producing method, the first film layer and the second film layer can be formed with the third optical film served as a base, and therefore the three film layers are brought into a laminated state at the same time of forming the first film layer and the second film layer. Thus, it is possible to shift to the subsequent cutting step without performing an additional step of laminating the film layers together.

Advantages of the Invention

As described above, according to the method of producing an optical film laminate of the present invention, it is possible to improve the yield per area of optical films to be used and improve the working property when an optical film laminate, which is formed by laminating three or more optical films having optical orientation axes to have the optical orientation axis of each film oriented at a predetermined angle, is produced.

DESCRIPTION OF REFERENCE CODES

1, 1': first film layer forming step, 2, 2': second film layer forming step, 5: film layer lamination step, 6: cutting step, 10: first optical film, 11 first optical film piece, 12: first film layer, 20: second optical film, 21: second optical film piece, 22: second film layer, 30: third optical film, 32: third film layer, 41: first surface protection film, 42: second surface protection film, 43 third surface protection film, 51: first adhesive film, 52: second adhesive film, 53: third adhesive film, 60: laminate, 70: optical film laminate chip, 411, 421, 431: adhesive layers, 412, 422, 432: surface protection layers, 511, 521, 531: adhesive layers, 512, 522, 532: releasing layers, X: optical orientation axis (slow axis) of a first optical film (a retardation film), Y: optical orientation axis (slow axis) of a second optical film (a retardation film), Z: optical orientation axis (absorption axis) of a third optical film (a polarizing film).

DETAILED DESCRIPTION OF THE PREFERRED EMBODIMENT

Figure 1:
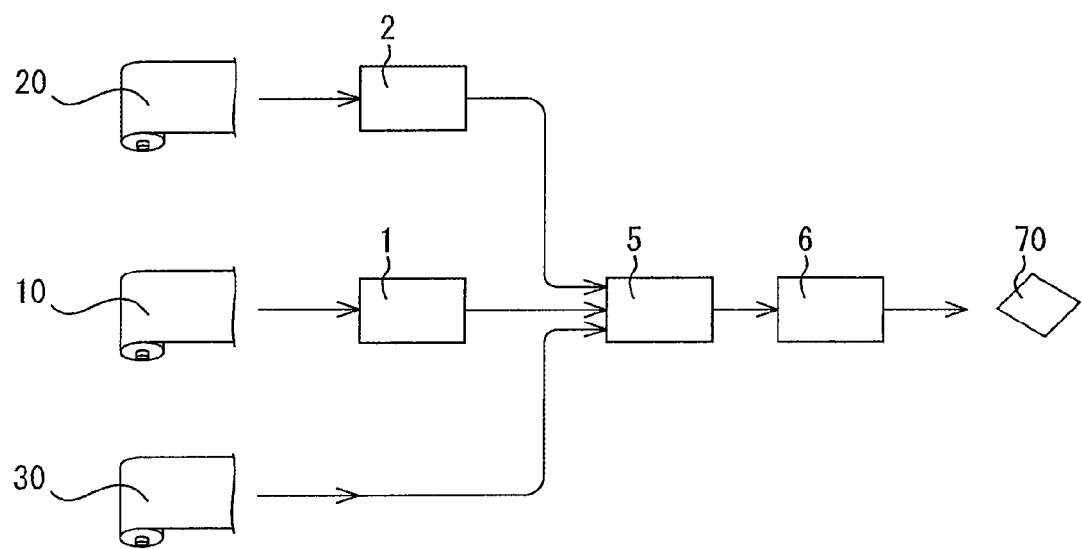
FIG. 1 is a flow diagram showing a method of producing an optical film laminate according to a first embodiment.

FIG. 1 is a flow diagram showing a first embodiment, which relates to a method of producing an optical film laminate according to the present invention. The first embodiment is a method of producing an optical film laminate chip 70 formed by laminating three or more optical films each having an optical orientation axis, which includes a first film layer forming step 1 of forming a first film layer by using a first optical film 10 having an elongated shape, a second film layer forming step 2 of forming a second film layer by using a second optical film 20 having an elongated shape, a film layer lamination step 5 of laminating a third film layer made of a third optical film 30, the first film layer 12 and the second film layer 22 together, and a cutting step 6 of cutting a laminate having the first to third film layers laminated together into plural optical film laminate chips 70.

For the first to third optical films, for example, known retardation films, brightness enhancement films and polarizing films or the like each having an optical orientation axis are used. This embodiment will be described by taking, for example, the case where retardation films respectively having slow axes (represented by "X" and "Y" in the Figure) parallel to the long side of each film, which function as optical orientation axes, are used as the first and second optical films, and a polarizing film having an absorption axis (represented by "Z" in the Figure) parallel to the long side of the film is used as a third optical film.

A retardation film is herein meant a. film that is capable of producing a phase difference of transmitted light when the light has been transmitted there through. Specifically, the refractive index in-plane of this film is different so as to allow the phase of transmitted light to be advanced in a direction in which the refractive index is minimum and to be retarded in a direction in which the refractive index is maximum. That is, the slow axis of a retardation film represents a direction in which the phase of light transmitted through the film is retarded, and, in other words, a direction in which the refractive index becomes maximum in the film in-plane.

Specifically, the retardation film may be produced by stretching a polymer film, and an example thereof includes a film which is produced by applying tension onto an unstretched film at an appropriate temperature and thereby increasing the molecular orientation along the stretching direction. An example of a polymer film includes a film which is produced by forming into a film shape at least one polymer material selected from the group consisting of acetate resin, polyester resin, polyethersulfone resin, polysulfone resin, polycarbonate resin, polyamide resin, polyimide resin, polyolefin resin, acrylic resin, polynorbornene resin, cellulose resin, polyarylate resin, polystyrene resin, polyvinyl alcohol resin, polyvinyl chloride resin, polyvinylidene chloride resin, polyacrylic resin, a mixture of a thermoplastic resin whose side chain has a substituted or unsubstituted imide group and a thermoplastic resin whose side chain has a substituted or unsubstituted phenyl group and a nitrile group, and a liquid crystal polymer. Examples of a film forming method include a casting method from solution and an extrusion molding method.

A polarizing film is herein meant a film that is capable of transmitting linearly polarized light when natural light is made incident on the polarizing film. Specifically, a polarizing film is designed to transmit one of polarizing elements of light made incident orthogonally, while block the other by absorption (or reflection or scattering). The absorption axis of the polarizing film represents a direction in which the polarized elements are absorbed.

Examples of the polarizing film include a film produced by, for example, dyeing and absorbing a substrate film of, for example, polyvinyl alcohol with a dichroic material, such as iodine and organic dyestuffs, and then stretching the film. Generally, the direction in which the film has been stretched becomes the absorption axis.

In the first film layer forming step 1, a first optical film having an elongated shape is cut along a cutting line crossing the longitudinal direction of the film into first optical film pieces, and the first optical film pieces are disposed adjacent to each other in a substantially band or strip shape, thereby forming a first film layer having an optical orientation axis crossing the longitudinal direction. In the first embodiment, when the first optical film pieces are disposed adjacent to each other in a substantially band or strip shape, an elongated first adhesive film having an adhesive layer and a releasing layer laminated on the adhesive layer is used and the first optical film pieces are placed on the adhesive film via the adhesive layer.

Figure 2:
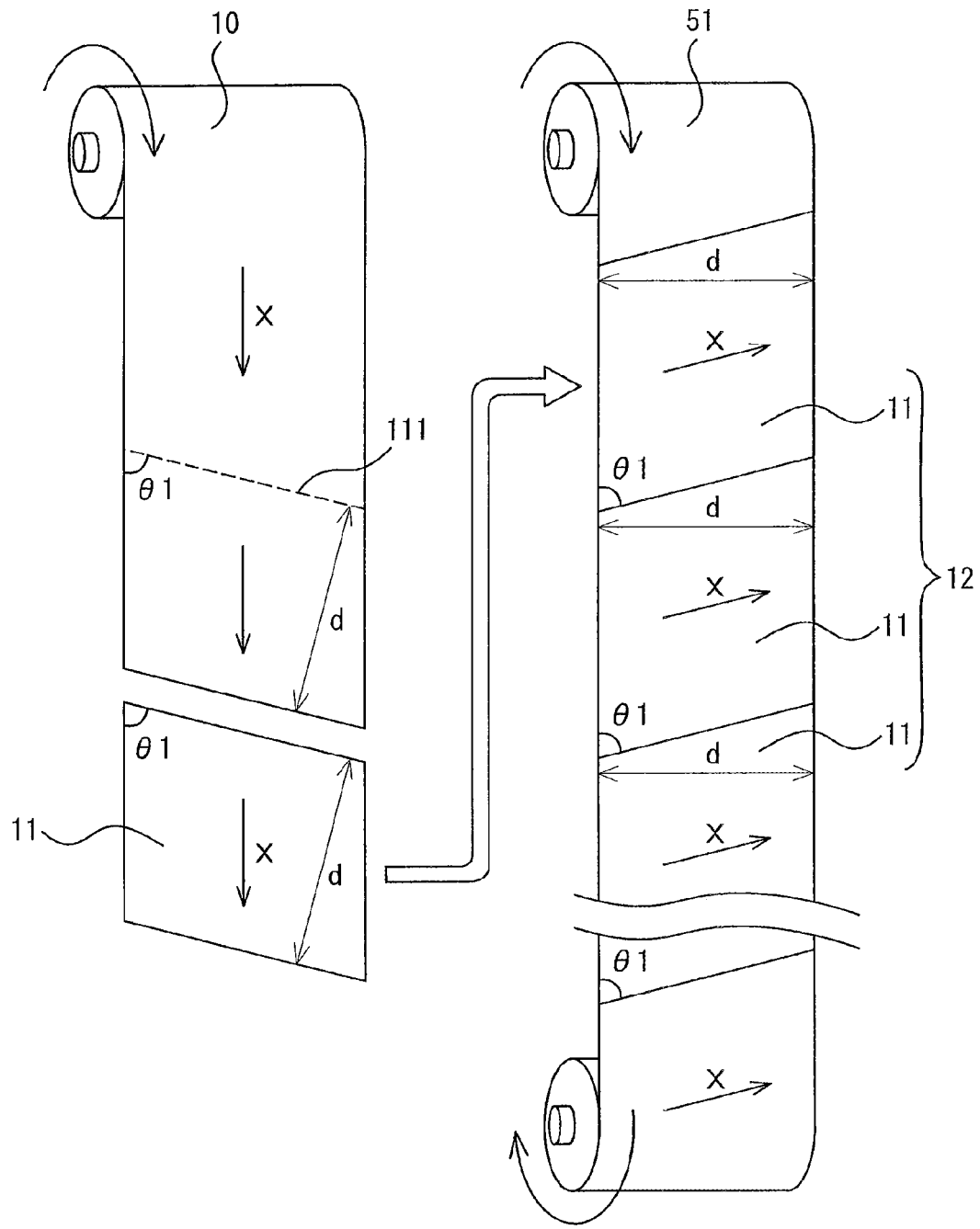
FIG. 2 is a view showing a step of forming a first film layer by using a first optical film in the method of producing an optical film laminate of the first embodiment.

Specifically, as shown in FIG. 2, the first optical film 10 is subsequently cut along cutting lines 111, which are cutting lines extending at a predetermined angle θ1 relative to the longitudinal direction of the first optical film 10, and the interval between the cutting lines 111 matches with the width d of the first adhesive film 51. The produced first optical film pieces 11 are disposed adjacent to each other on the first adhesive film 51. in a band or strip shape and have an optical orientation axis X crossing the longitudinal direction of the band or strip.

The first adhesive film 51 is herein meant a film having a releasing layer and an adhesive layer, and designed to allow the first optical film pieces 11 to be laminated thereto by adhesive properties of the adhesive layer. For the first adhesive film 51, a film having another releasing layer in a pre-use state so that an adhesive layer 511 has both sides covered with adhesive layers may be used.

Figure 3:
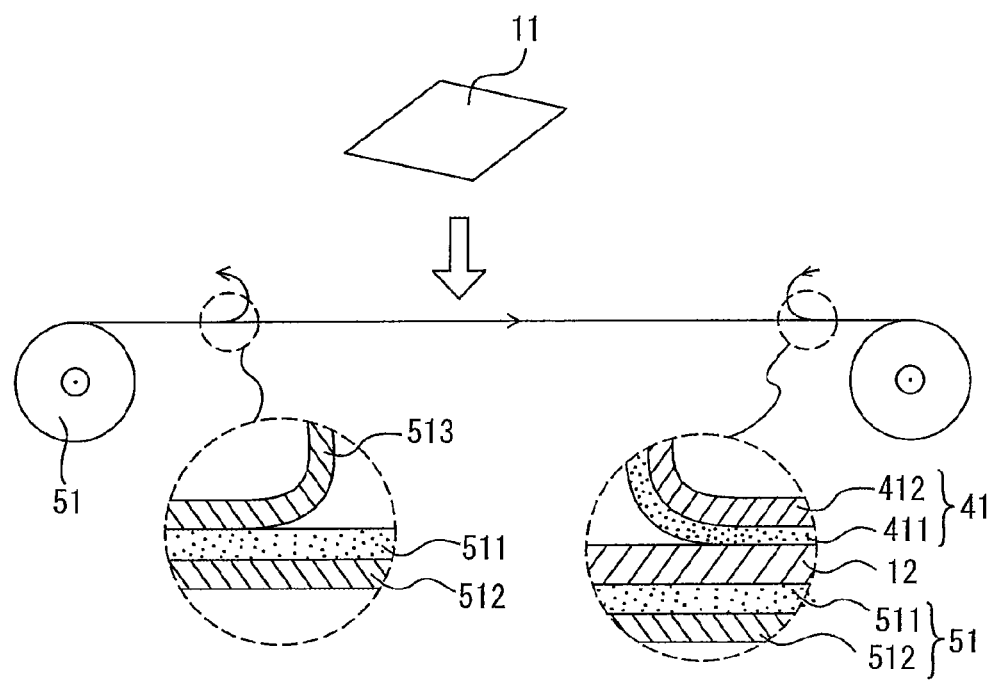
FIG. 3 is a view showing a step of forming a first film layer by using an adhesive film with opposite surfaces, on which adhesive layers are respectively covered with releasing layers, in the method of producing an optical film laminate of the first embodiment.

Specifically, as shown in FIG. 3, it is possible to employ a method, in which both the front and back sides of the adhesive layer 511 are respectively covered with a releasing layer 512 and a releasing layer 513, and a first adhesive film 51 wound into a roll is used, while the releasing layer 513 is removed prior to the lamination step of the first optical film pieces 11 to expose the adhesive layer 511 to the outside; then the first optical film pieces 11 are subsequently laminated in the manner mentioned above to form a first film layer 12; and then a surface protection film 41 41 with an adhesive layer 411 and a surface protection layer 412 formed thereon is laminated onto an upper surface of the first film layer 12.

The angle θ1 of the cutting lines 111 relative to the longitudinal direction of the first optical film 10 is served as a basis to determine the angle of the optical orientation axis X of the first film layer 12 formed on the first adhesive film 51 and hence the angle of the optical orientation axis X of the optical film laminate chip 70. Therefore, in consideration of the relationship relative to the optical orientation axis of an optical film of another film layer, the angle θ1 is appropriately adjusted according to the intended use of the optical film laminate chip 70 to be formed, or the like factor.

Figure 4:
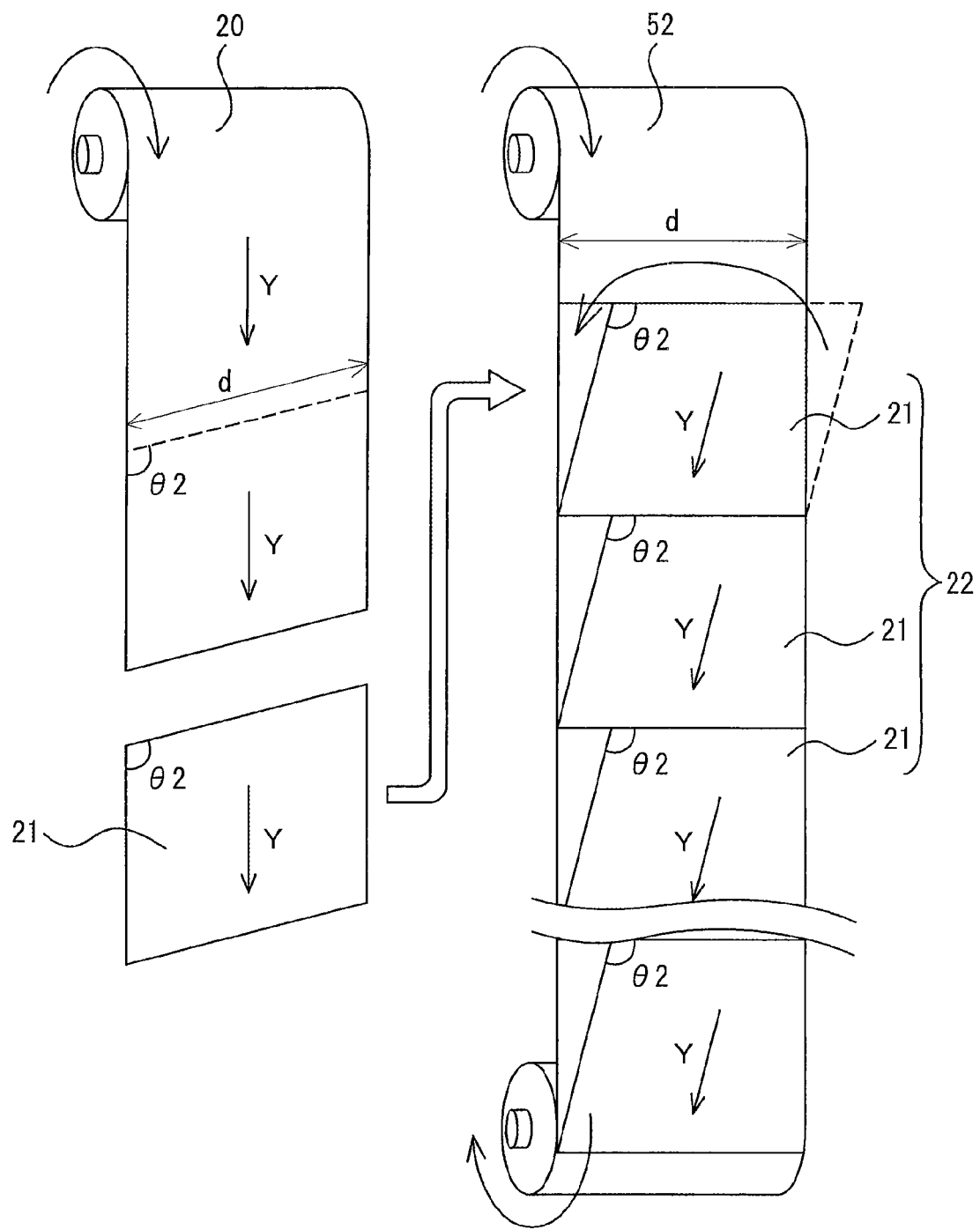
FIG. 4 is a view showing a step of forming a second film layer in the method of producing an optical film laminate of the first embodiment.

The second film layer forming step 2 may be performed in a similar procedure to the first film layer forming step 1, and as shown in FIG. 4, a second film layer 22 with second optical film pieces 21 disposed in a band or strip shape on a second adhesive film 52 is formed.

However, as shown in FIG. 4, the angle θ2 of cutting lines relative to the longitudinal direction of the second optical film 20 may be set to be different from the angle θ1 of the cutting lines relative to the longitudinal direction of the first optical film 10, and thereby it is possible to produce the optical film laminate chip 70 formed to allow the optical orientation axis to be oriented at a desirable angle for each film layer.

When a protruding portion (represented in broken line in FIG. 4) of each of the second optical film pieces 21, which have been laminated on the second adhesive film 52, is generated, as shown in FIG. 4, this portion is cut and may be laminated to a portion of the second adhesive film 52 where no second optical film pieces 21 are laminated thereon.

Thus, the first film layer 12 formed on the first adhesive film 51 by the first film layer forming step 1 can be produced, and the second film layer 22 formed on the second adhesive film 52 by the second film layer forming step 2 can be produced. As shown in FIG. 24, the produced first film layer 12 and second film layer 22 respectively have the surface protection films 41, 42 laminated thereon, and may be temporarily stored while being kept wound into a roll.

The film, layer lamination step 5 is a step of laminating the first film layer 12 and the second film layer 22 produced in the manner mentioned above onto a third film layer made of a third optical film 30. This embodiment will be described by taking, for example, a case where the film layer lamination step 5 is performed by that, as the third optical film 30 made of the third film layer, a third optical film 30 having an optical orientation axis, having an elongated shape and wound into a roll is used; and while this third optical film 30 is being fed out, it is laminated to the first and second film layers by roll to roll lamination.

Figure 5:
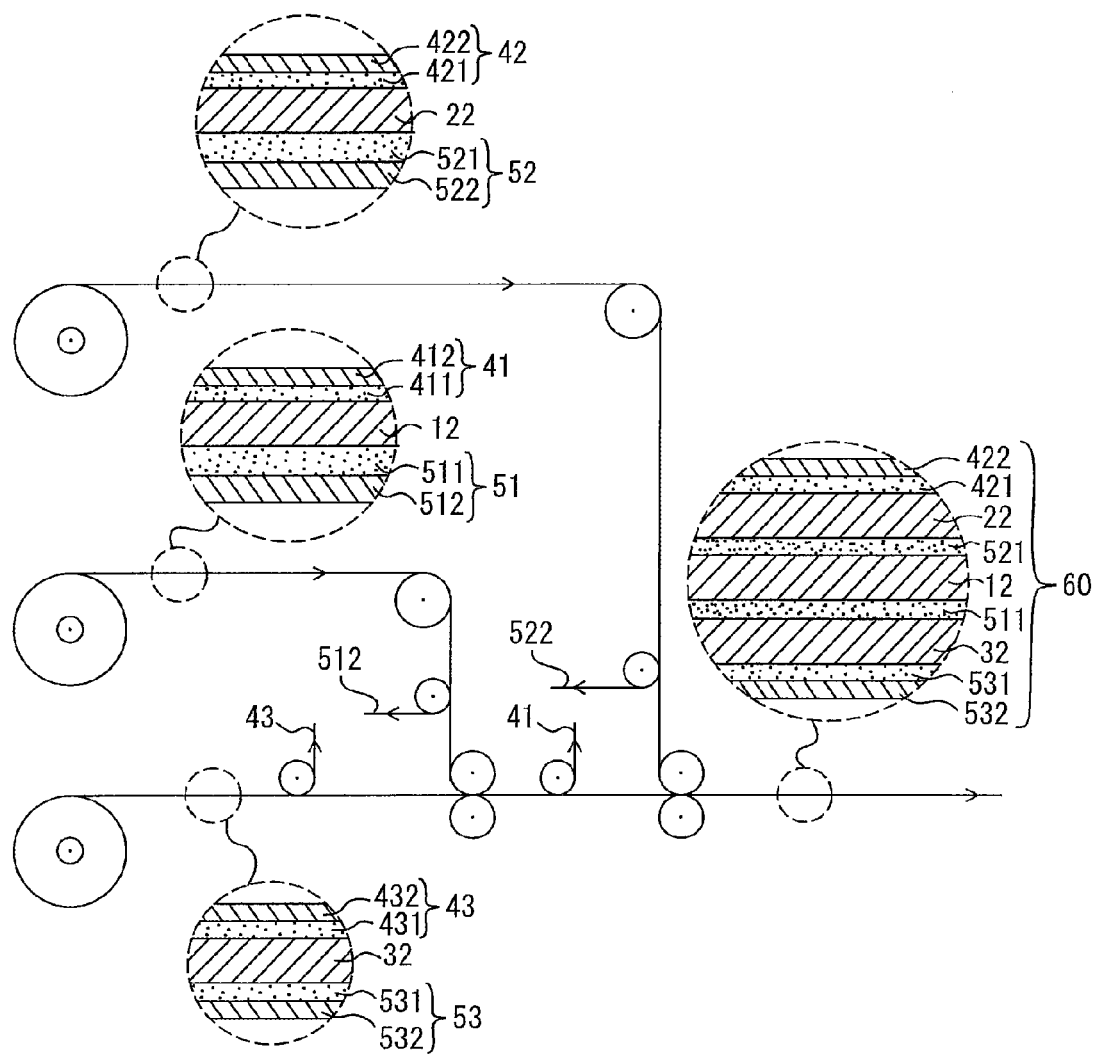
FIG. 5 is a view showing a lamination step of laminating first to third film layers together in the method of producing an optical film laminate of the first embodiment.

Specifically, as shown in FIG. 5, a third film layer 32 that has an upper surface, on which a third surface protection film 43 having a surface protection layer 432 and an adhesive layer 431 is laminated, and a lower surface, on which a third adhesive film 53 having a releasing layer 532 and an adhesive layer 531 is laminated, is fed out from a raw film roll in the film's longitudinal direction, and the third surface protection film 43 is removed so as to expose the upper surface of the third film layer 32 to the outside.

On the other hand, the first film layer 12 that has an upper surface, on which the first surface protection film 41 having a surface protection layer 412 and an adhesive layer 411 is laminated, and a lower surface, on which the first adhesive film 51 having a releasing layer 512 and an adhesive layer 511 is laminated, is fed out from a raw film roll in the films longitudinal direction in a similar manner, and only the releasing layer 512 is removed with the adhesive layer 511 left on the first film layer 12.

Then, the third film layer 32 and the first film layer 12 are laminated together via the adhesive layer 511 exposed to the outside, and then the first surface protection film 41 laminated on the upper surface of the first film layer 12 is removed to expose the upper surface of the first film layer 12 to the outside.

Then, in a similar manner to that of the first film layer 12, the second film layer 22 that has an upper surface, on which the second surface protection film 42 having the surface protection layer 422 and the adhesive layer 421 is laminated, and a lower surface, on which a second adhesive film 52 having the releasing layer 522 and the adhesive layer 52 is laminated, is fed out from a. raw film roll in the film's longitudinal direction, and only the releasing layer 522 is removed with the adhesive layer 521 left on the second film layer 22.

Then, the second film layer 22 and the first film layer 12 are laminated together via the adhesive layer 521 exposed to the outside.

Thus, a laminate 60 is formed by the lamination of the third releasing layer 532, the adhesive layer 531, the third film layer 32, the adhesive layer 511, the first film layer 12, the adhesive layer 521, the second film layer 22, the adhesive layer 421 and the surface protection layer 422 in this order from the lower side.

Since the first to third film layers used in the lamination step each have an elongated shape, the laminate 60 produced in the film layer lamination step 5 has necessarily an elongated shape. Therefore, the laminate 60 also can be stored while being appropriately kept wound into a roll according to the needs and circumstances.

Figure 6:
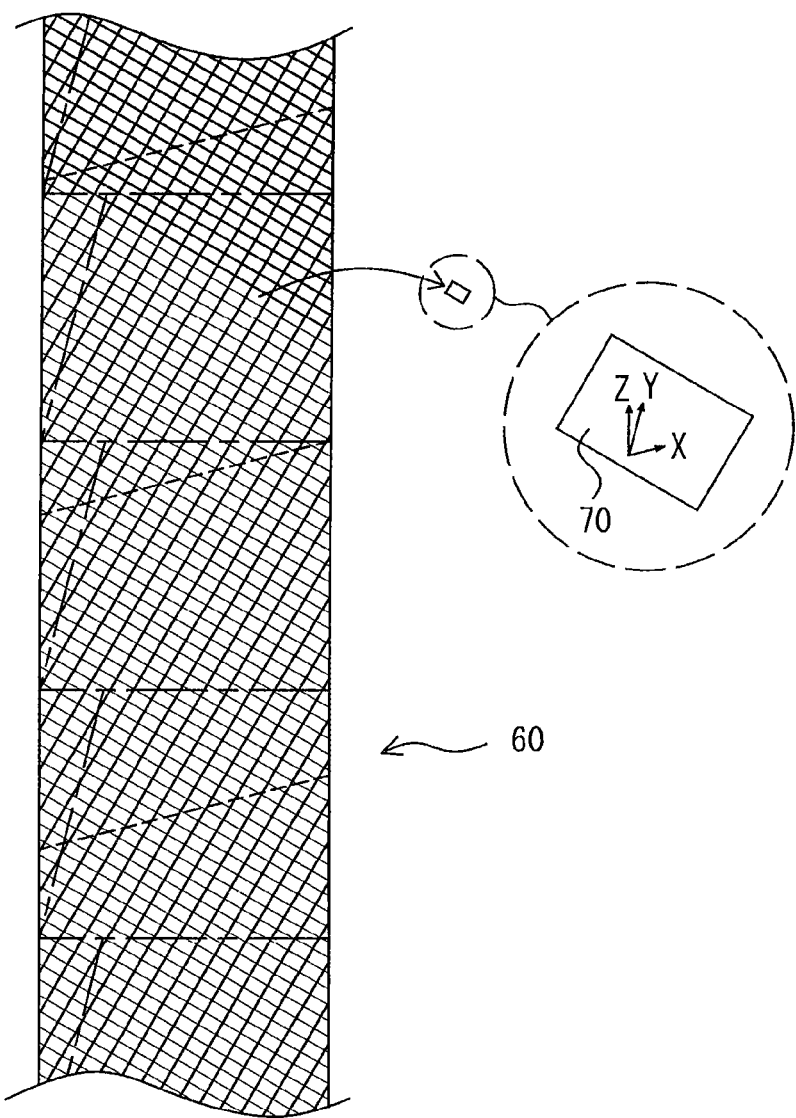
FIG. 6 is a plan view showing a laminate produced by a lamination step in the method of producing an optical film laminate of the first embodiment.
Figure 7:
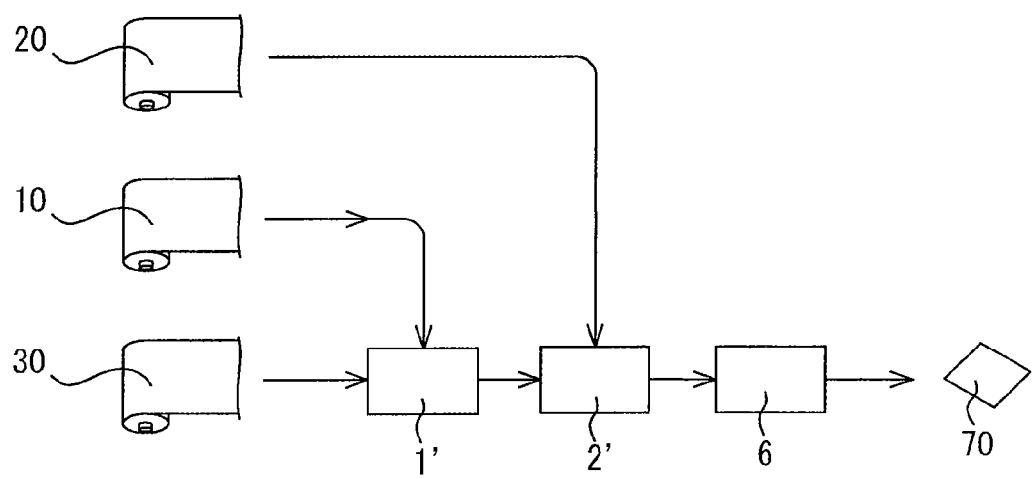
FIG. 7 is a flow diagram showing a method of producing an optical film laminate according to a second embodiment.

As shown in FIG. 6, the cutting step 6 is a step of cutting the laminate 60 having the first to third film layers laminated together into optical film laminate chips 70 each having a desirable shape and size. The shape and size of the optical film laminate chip 70 thus prepared by cutting are not necessarily limited to a specific shape and size, and may be appropriately determined according to the intended use.

Herein, taking notice on the laminate 60 to be cut in this embodiment, as shown in FIG. 6, the first film layer 12 and the second film layer 22 of the laminate 60 are both formed into a band or strip shape in a similar manner to the third film layer 13, and therefore the entire area of the laminate 60 is used for forming the optical film laminate chips 70 without generating useless portions in the cutting step 6.

That is, in the method of producing a conventional laminate chip, when three or more optical films have been laminated together, areas on which any of these optical films do not exist, are generated around the laminate. Therefore, those areas cannot be used to form a laminate chip, and therefore those areas cause deterioration in the yield of used optical films. In this respect, the method of this embodiment enables the forming of optical film laminate chips 70 by using the entire area of the laminate 60 and thus achieves great improvement in the yield of optical films.

However, in this embodiment, among the thus produced optical film laminate chips 70, when there are some pieces, which are produced from jointed portions of the first optical film pieces 11, that is, joints (represented by broken lines in FIG. 6), or jointed portions of the second optical film pieces 21, that is, joints (represented by dashed lines in FIG. 6), these chips 70 may be removed by any removing means. Alternatively, it is possible to perform the cutting step 6 only for the areas having no such jointed portions (joints) of those optical film pieces, and form only the optical film laminate chips 70 having no jointed portions.

No limitation is intended to a specific cutting method in the cutting step 6, and it is possible to employ any conventionally known method, such as a method of punching out the laminate 60 by Thomson blade die, etc., or a method of cutting the laminate 60 by utilizing a cutter, laser light or water pressure, or any other appropriate conventional methods.

The optical film laminate chips 70 produced in the film layer laminate step each have, as shown in FIG. 6, the first film layer 12 having the first optical film pieces 11 disposed thereon in a predetermined direction, the second film layer 22 having second optical film pieces disposed thereon in a predetermined direction, and the third film layer 32 made of a third optical film laminated together, in which the optical orientating axes X, Y and Z of the respective film layers are oriented at a predetermined angle relative to each other.

According to the method of producing an optical film laminate of this embodiment, it is possible to prepare plural kinds of the first film layer and the second film layer each having an optical orientation axis oriented at a predetermined angle and store each of them while being kept wound into a roll. Therefore, in producing an optical film laminate, it is possible to instantly produce an optical film laminate by selecting an appropriate film layer from plural raw film rolls previously formed according to the necessary product specification, and then performing only the lamination step and the cutting step, when an optical film laminate is produced.

Furthermore, since the respective film layers can be handled as raw film rolls, working property can be improved as compared with a case where they are, for example, stored in the form of a sheet member.

According to this embodiment, since the laminate 60 having the first to third film layers laminated together by the film layer lamination step is also formed into a band or strip shape, it can also be stored while being kept wound into a roll, and hence the working property in handling the laminate 60 can be improved.

In this embodiment, only the first and second film layers are each cut in a predetermined direction and then these are disposed in a band or strip shape to prepare first and second film layers. However, the present invention is not necessarily limited to this.

Specifically, the third optical film 30 may be cut into pieces in a predetermined direction and then the pieces may be disposed adjacent to each other in a band or strip shape in a similar manner to the first and second film layers; or another optical film may be used, in which this optical film is cut into pieces in a predetermined direction and then the pieces are disposed adjacent to each other in a band or strip shape in a similar manner to the fist film layer, etc., to form a new film layer in addition to the first and second film layers.

The order in which the film layers are laminated may also be changed in an appropriate manner.

Now, the description will be made for the second embodiment, which relates to the method of producing an optical film laminate of the present invention. With respect to the same structures or arrangements as those of the first embodiment, the same reference numerals are used to omit the description thereof, while the description will be made only for the different structures or arrangements from those of the first embodiment.

The method of producing an optical film laminate of the second embodiment includes a first film layer forming step 1' of forming a first film layer 12 on a third film layer 32 made of a third optical film 30 when the first film layer 12 is formed by using a first optical film 10 having an elongated shape; a second film layer forming step 2' of forming a second film layer 22 on the first film layer 12 formed by the first film layer forming step 1' when the second film layer 22 is formed by using a second optical film 20 having an elongated shape; and a cutting step 6 of cutting a laminate 60 having the first to third film layers laminated together into plural optical film laminate chips 70.

Figure 8:
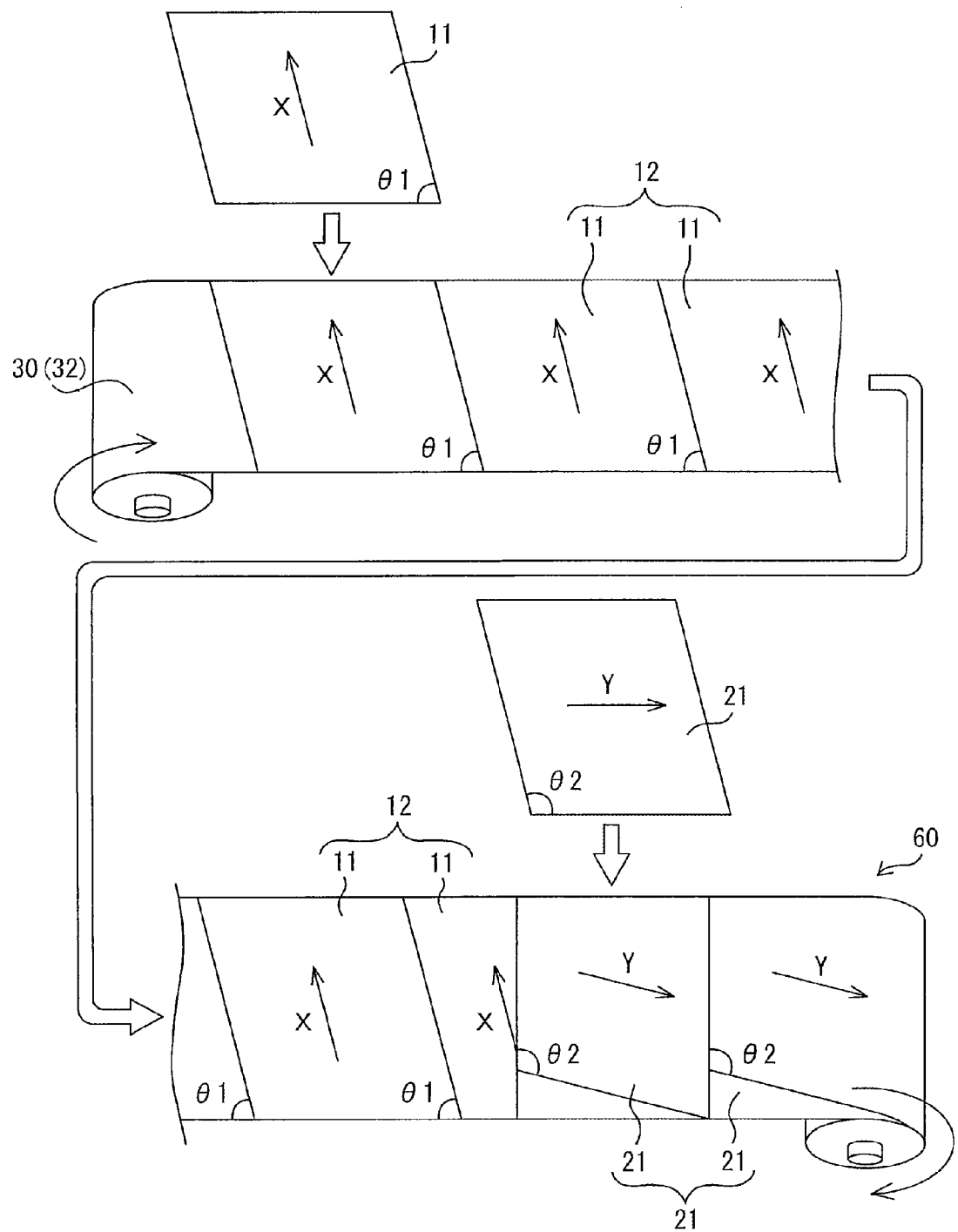
FIG. 8 is a view showing a step of forming a first film layer and a step of forming a second film layer in the method of producing an optical film laminate of the second embodiment.
Figure 9:
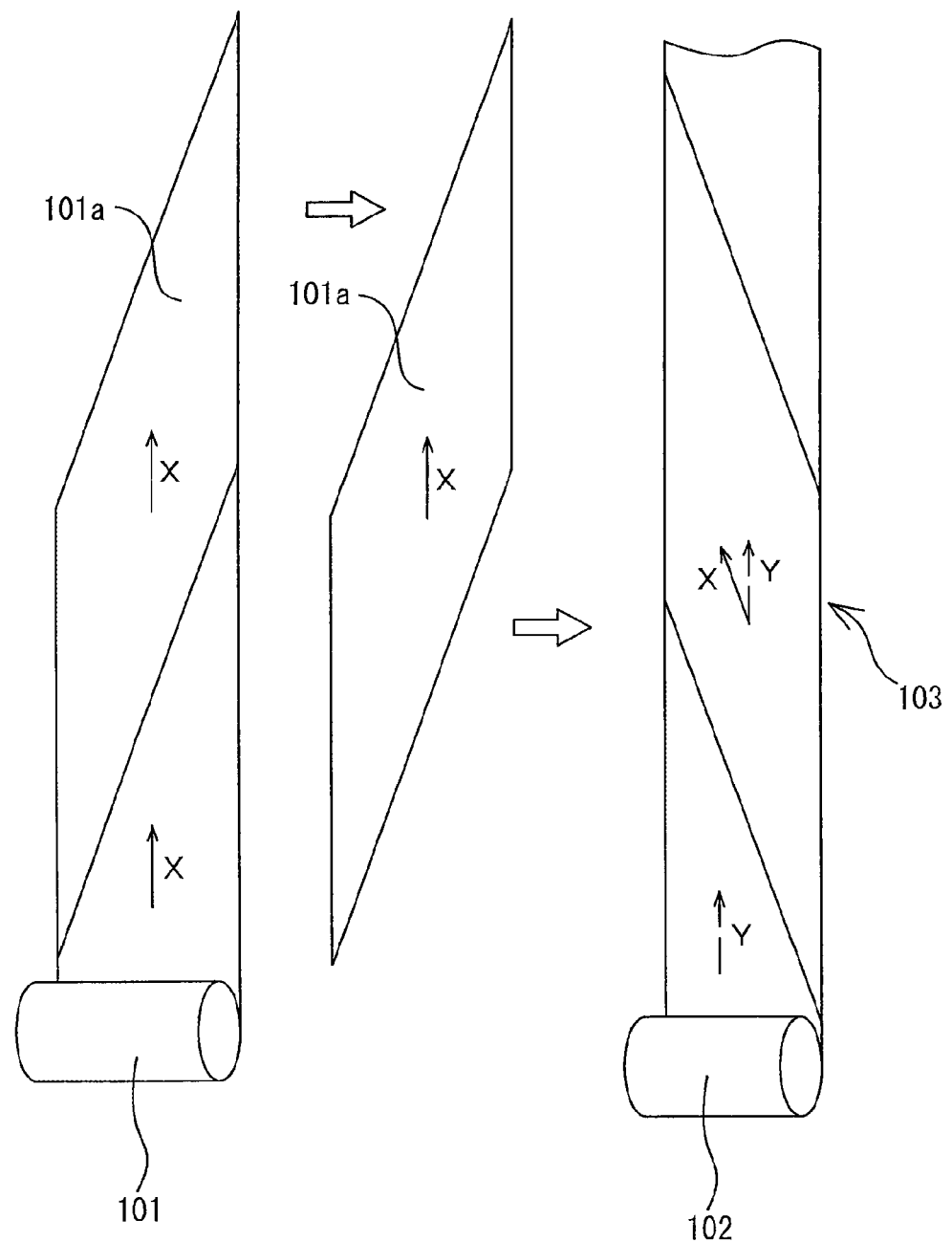
FIG. 9 is a conceptual diagram showing a step of cutting a first optical film 101, and a step of laminating a cut piece 101a to a second optical film 102, thereby preparing a laminate intermediate 103, in a conventional A-type producing method.
Figure 10:
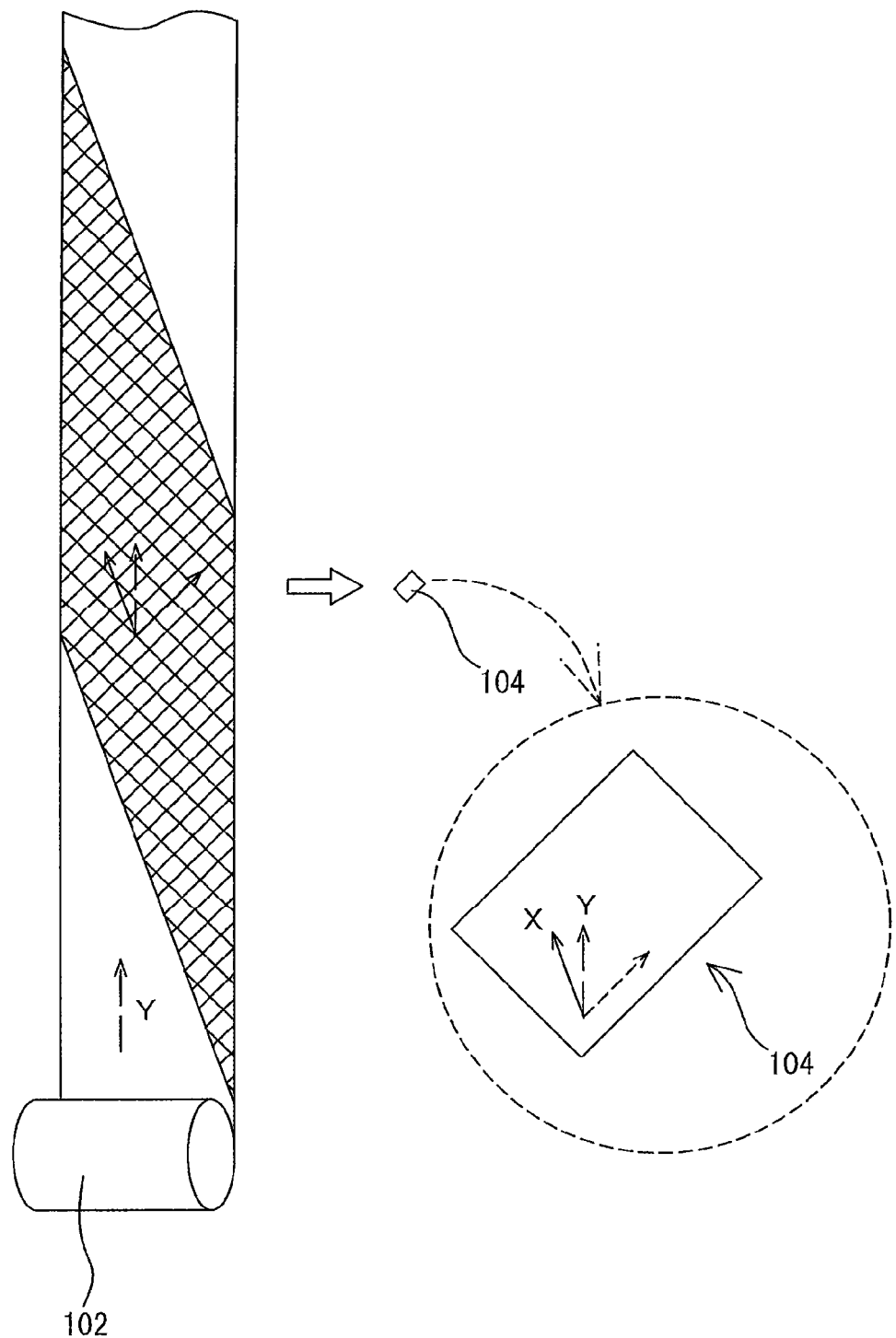
FIG. 10 is a conceptual diagram showing a step of cutting the laminate intermediate 103, thereby preparing an optical film laminate 104 having a predetermined shape, in the conventional A-type producing method.
Figure 11:
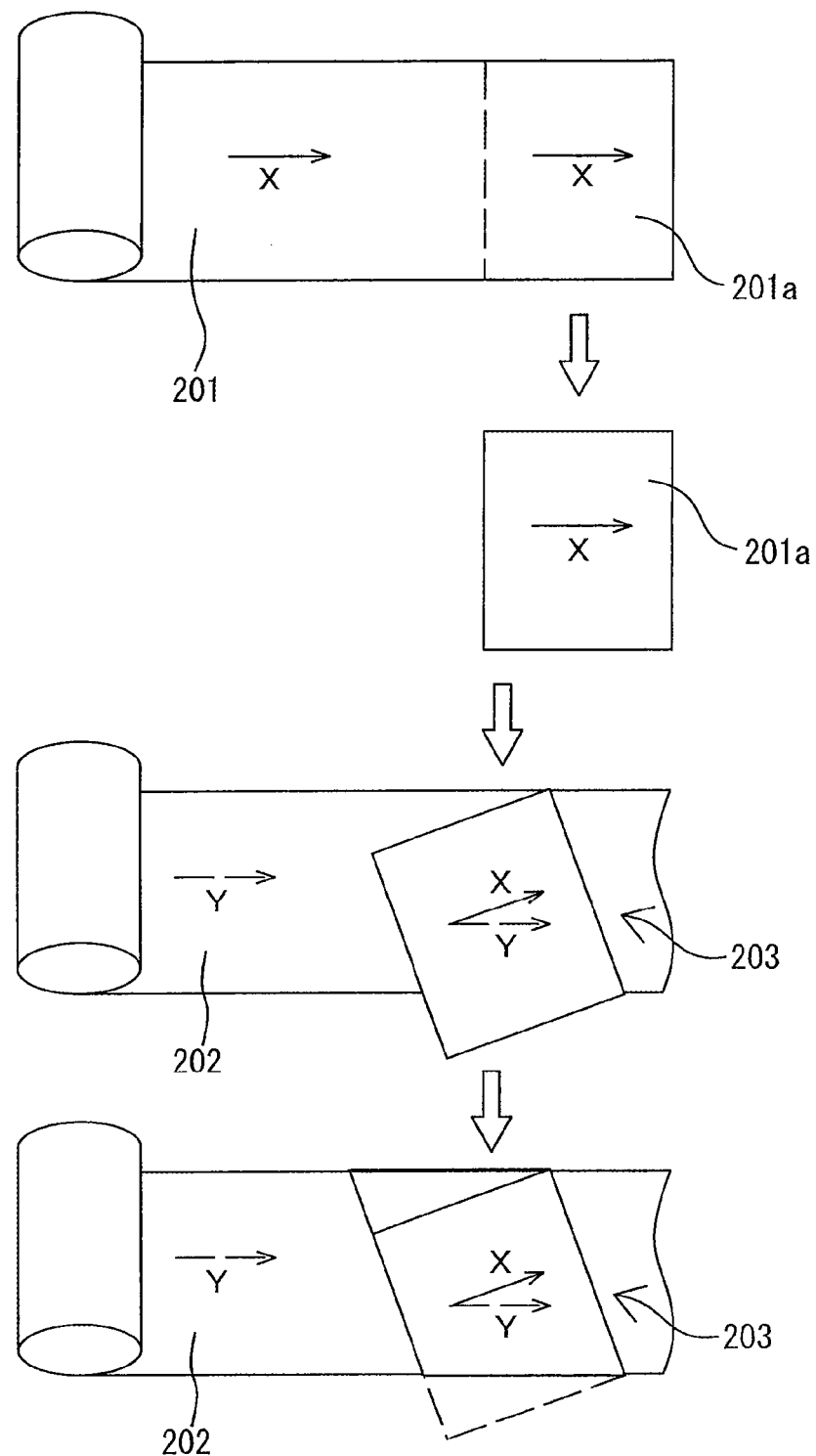
FIG. 11 is a conceptual diagram showing a step of cutting a first optical film 201, and a step of laminating a cut piece 201a to a second optical film 202, thereby preparing a laminate intermediate 203, in a conventional Btype producing method.
Figure 12:
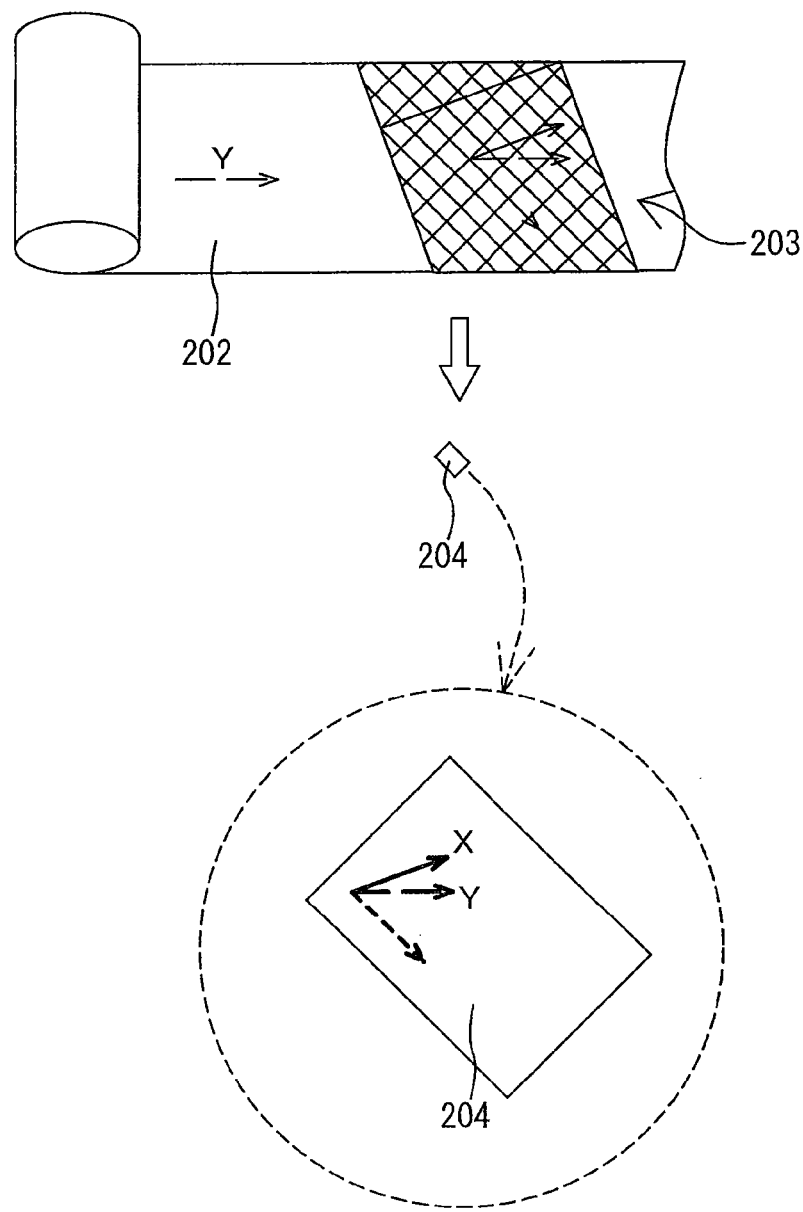
FIG. 12 is a conceptual diagram showing a step of cutting the laminate intermediate 203, thereby preparing an optical film laminate 204 having a predetermined shape, in the conventional B-type producing method.

That is, according to the method of producing an optical film laminate of the second embodiment, as shown in FIG. 8, a film layer is not formed on an adhesive film as the first embodiment, but the first optical film pieces 11 are placed directly on the third film layer 32 made of the third optical film 30 and thereby the first optical film pieces 11 are disposed adjacent to each other in a substantially band or strip shape, thereby forming a first film layer 12 having an optical orientation axis X crossing the longitudinal direction of the film.

For the second film layer 22, the above is also applicable. That is, a film layer is not formed on an adhesive film but the second film layer 22 is formed on the first film layer 12.

Laminating the optical films together is made via an adhesive layer (not 15 shown).

A laminate 60 produced through the first film layer forming step 1' and the second film layer forming step 2 has a similar structure or arrangement to that of the first embodiment. Accordingly, the cutting step 6 may be made in a similar manner to the first embodiment.

Specifically, any of the first film layer 12 and the second film layer 22 of the laminate 60 is formed into a band or strip shape as that of the third film layer 13, and in the cutting step 6, the entire area of the laminate 60 is used to form optical film laminate chips 70 without generating useless portions. Thus, the method of this embodiment enables the forming of optical film laminate chips 70 by using the entire area of the laminate 60 and thus achieves great improvement in the yield of optical films.

EXAMPLES

The yield of an optical film to be used was calculated based on the simulation with respect to the case (Example) where an optical film laminate is formed by the method of producing an optical film laminate of the present invention; the case (Comparative Example 1) where an optical film laminate is formed by employing both the conventional A-type method and the conventional B-type method; and the method (Comparative Example 2) where an optical film is cut into pieces, each having a shape similar to a chip and each containing a predetermined number of chips, and then these pieces are laminated together and cut into chips.

Calculation Example 1

A retardation film having a width of 1150 mm was used for a first optical film and a second optical film, and a polarizing film having a width of 1180 mm was used for a third optical film. The calculation was made for the case where these are laminated together to form a laminate chip (a three-layer product) having a length of 30 mm and a width of 40 mm.

The slow axis of the retardation film as the first optical film, the slow axis of the retardation film as the second optical film and the absorption axis of the polarizing film as the third optical film were respectively set at 45°, 105° and 120° relative to the long side of the laminate chip.

The yield (%) per area of each of the used first to third optical films was calculated and each average value was calculated, which average value was designated as the yield of each method. The result is shown in Table 1.

TABLE 1

|  | First optical film | Second optical film | Third optical film | Average value |
| --- | --- | --- | --- | --- |
| Example 1-1 | 82.2% | 82.2% | 82.2% | 82.2% |
| Comparative Example 1-1 | 65.9% | 84.5% | 84.5% | 78.1% |
| Comparative Example 2-1 | 76.0% | 84.0% | 73.5% | 77.8% |

Calculation Example 2

A retardation film having a width of 820 mm, a retardation film having a width of 1090 mm and a retardation film having a width of 1250 mm were used respectively for first to third optical films, and a polarizing film having a width of 1185 mm was used for a fourth optical film. The calculation was made for the case where these are laminated together to form a laminate chip (a four-layer product) having a length of 30 mm and a width of 40 mm.

The slow axis of the retardation film as the first optical film, the slow axis of the retardation film as the second optical film, the slow axis of the retardation film as the third optical film and the absorption axis of the polarizing film as the fourth optical film were respectively set at 45°, 105°, 120° and 30° relative to the long side of the laminate chip.

The yield (%) per area of each of the used first to fourth optical films was calculated and each average value was calculated, which average value was designated as the yield of each method. The result is shown in Table 2.

TABLE 2

|  | First optical film | Second optical film | Third optical film | Fourth optical film | Average value |
| --- | --- | --- | --- | --- | --- |
| Example 1-2 | 79.2% | 79.2% | 79.2% | 79.2% | 79.2% |
| Comparative Example 1-2 | 68.0% | 81.0% | 59.3% | 56.5% | 66.2% |
| Comparative Example 2-2 | 68.2% | 77.0% | 80.2% | 74.5% | 75.0% |

As shown in Table 1 and Table 2, it is found that the yield per area of the optical film of Example of the present invention has been improved as compared with the conventional methods.

The invention claimed is:

1. A method of producing an optical film laminate having three or more optical films laminated together, each of the optical films having an optical orientation axis, the method comprising:
a first film layer forming step of cutting a first optical film having an elongated shape into first optical film pieces along cutting lines crossing the longitudinal direction of the first optical film and disposing the first optical film pieces adjacent to each other in a substantially band or strip shape directly on a first elongated adhesive film, thereby forming a first film layer having an optical orientation axis crossing the longitudinal direction of the band or strip-shaped first optical film pieces,
wherein the first elongated adhesive film comprises a first releasing layer and a first adhesive layer laminated on the first releasing layer, and
wherein the first optical film pieces are laminated directly on the first adhesive layer side of the first elongated adhesive film; and
a second film layer forming step of cutting a second optical film having an elongated shape into second optical film pieces along cutting lines crossing the longitudinal direction of the second optical film and disposing the second optical film pieces adjacent to each other in a substantially band or strip shape directly on a second elongated adhesive film, thereby forming a second film layer having an optical orientation axis crossing the longitudinal direction of the band or strip-shaped second optical film pieces, wherein the second elongated adhesive film comprises a second releasing layer and a second adhesive layer laminated on the second releasing layer, and wherein the second optical film pieces are laminated directly on the second adhesive layer side of the second elongated adhesive film and a lamination step of laminating a third film layer made of a third optical film, the first film layer and the second film layer together via the first adhesive layer which has been exposed to the outside by removing the first releasing layer and the second adhesive layer which has been exposed to the outside by removing the second releasing layer; and a cutting step of cutting the first, second and third film layers held in a laminated state into plural optical film laminates.

2. The method of producing an optical film laminate according to claim 1, further comprising:

a first film layer winding step of winding the first film layer, which has been formed into an elongated shape by placing the first optical film pieces on the adhesive film, into a roll along with the adhesive film;

a second film layer winding step of winding the second film layer, which has been formed into an elongated shape by placing the second optical film pieces on the adhesive film, into a roll along with the adhesive film; and a successive lamination step of bringing the first to third film layers into a laminated state by laminating the first film layer and the second film layer, each having been wound into a roll, to the third film layer having been wound into a roll, by roll to roll lamination.

3. The method of producing an optical film laminate according to claim 1, wherein at least one of an angle $\theta_1$ defined between the longitudinal direction of the first optical film and the cutting lines of the first optical film and an angle $\theta_2$ defined between the longitudinal direction of the second optical film and the cutting lines of the second optical film is more than 0° to not more than 35°.

4. The method of producing an optical film laminate according to claim 1, wherein the first optical film, the second optical film and the third optical film comprise any one of a retardation film, a brightness enhancement film and a polarizing film.

5. The method of producing an optical film laminate according to claim 4, wherein any one of the first optical film and the second optical film comprises a retardation film and the remaining one comprises a brightness enhancement film, and the third optical film comprises a polarizing film.

6. The method of producing an optical film laminate according to claim 1, wherein the optical axes of the first, second and third optical film layers are oriented at a predetermined angle relative to each other.

* * * * *